April 24, 1934.    M. KEIM    1,955,963

VAPORIZER

Filed March 2, 1933

Inventor:
Melville Keim
By Brayton Richards
Atty.

Patented Apr. 24, 1934

1,955,963

UNITED STATES PATENT OFFICE 1,955,963

VAPORIZER

Melville Keim, Chicago, Ill.

Application March 2, 1933, Serial No. 659,295

6 Claims. (Cl. 167—3)

The invention relates to improvements in vaporizers especially adapted for use in disseminating chemical vapors for the destruction of moths or the prevention of damage therefrom, or for deodorizing purposes, or for use in treatment of colds, the primary object of the invention being the provision of a simple and efficient apparatus of the class described which is capable of economical production.

Another object of the invention is the provision of an improved apparatus of the class described made in two parts and provided with convenient and effective means for removably locking said parts together and suspending the same in position of use.

Other objects will appear hereinafter.

The invention consists in the combinations and arrangements of parts hereinafter described and claimed.

Figure 1:
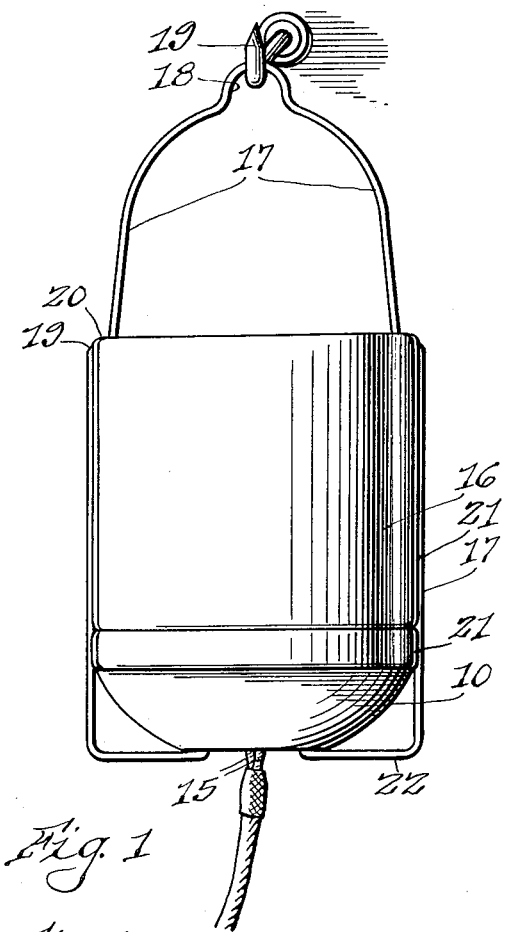
Figure 2:
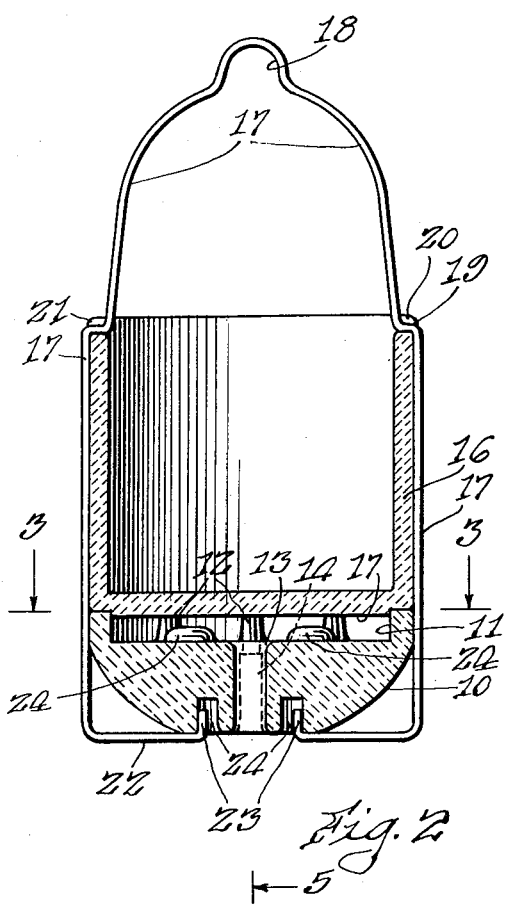
Figure 3:
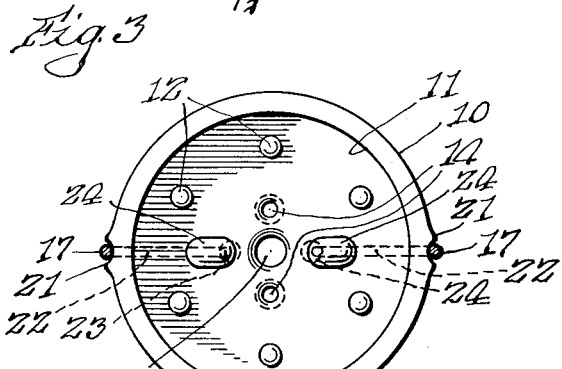
Figure 4:
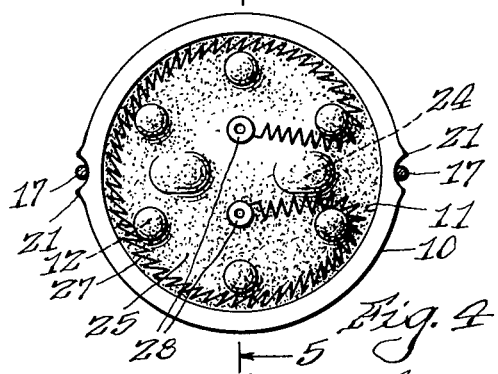
Figure 5:
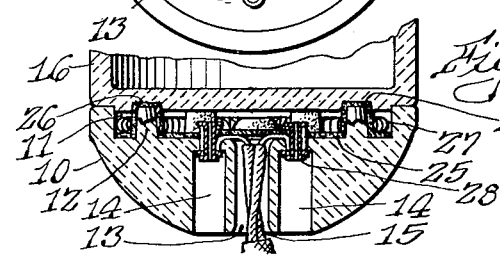

The invention will be best understood by reference to the accompanying drawing forming a part of this specification, and in which Fig. 1 is a front view of the vaporizer embodying the invention;

Fig. 2 a vertical transverse section of the same with the electrical heating element removed;

Fig. 3 a horizontal section taken substantially on line 3—3 of Fig. 2;

Fig. 4 a view similar to Fig. 3 but showing an electrical heating element in place; and Fig. 5 a section taken substantially on line 5—5 of Fig. 4.

The embodiment of the invention illustrated in the drawing comprises a suitable base member 10, preferably made of porcelain or other suitable insulating material and having in its top an open shallow socket 11 provided with a plurality of positioning pins 12, adapted and arranged to receive and position a suitable electrical heating element. A central opening 13 and lateral openings 14 are provided in the bottom of the base 10 to facilitate entry of the feed wires 15 for the heating element and for attaching purposes.

Associated with the base 10 is a vaporizer bowl 16, also preferably of porcelain or the like, and having a central shallow projection 17 fitting snugly within the mouth of the socket 11 and thereby positioning said bowl centrally on said base, as best shown in Fig. 2. A wire binder and suspension member 17 is provided for the purpose. This consists of a single spring wire member folded on itself to form a suspension loop 18 at its top adapted and arranged to engage a suspension hook 19, as indicated in Fig. 1. The sides of the binder 17 diverge downwardly from the loop 18 to the top of the bowl 16 and are there provided with horizontally extending locking shoulders 19 adapted and arranged to engage notches 20 in opposite sides of the mouth of the bowl 16 as shown in Fig. 2. The sides of the binder 17 extend vertically and downwardly from the shoulders 19 through a locking groove provided between registering projections or ribs 21 on the sides of the bowl 16 and base 10, as indicated. The lower ends 22 of the binder 17 are extended inwardly and horizontally and the extreme inner ends 23 are turned upwardly to engage sockets 24 in the bottom of the base 10. By this arrangement a simple combined binder and suspending element is provided by means of which the bowl and base may be detachably secured together and suspended in position of use.

Two bosses or projections 24 are formed in socket 11 as shown and a heat insulating sheet 25 is pressed into the socket 11 over the pins 12 and bosses 24. Recesses 26 are formed in the bottom of bowl 16 to receive the tops of the pins 12 thereby preventing turning of the bowl on the base.

An electrical heating element or resistance coil 27 is arranged in the socket 11 around the pins 12 and has its ends secured by the rivets 28 to the ends of the wires 15 as shown in Figs. 4 and 5. By this arrangement the heating element 27 will be nicely held in place and current supplied thereto as will be readily understood by those skilled in this art. Should the heating element 27 break or become disengaged from the rivets 28 the bosses 24 will prevent the ends thereof from directly contacting with each other and thereby forming a short circuit.

In use the exterminating material to be vaporized is placed in the bowl 10 and heat applied thereto by means of the electric heating element supplied with current through the wires 15. The apparatus is capable of economical production and will be found to be highly efficient in use. The arrangement disclosed is a simple and effective one for the purpose.

While I have illustrated and described the preferred form of construction for carrying my invention into effect, this is capable of variation and modification without departing from the spirit of the invention. I, therefore, do not wish to be limited to the precise details disclosed but desire to avail myself of such variation and modifications as fall within the scope of the appended claims.

I claim:

1. Apparatus of the class described comprising a base arranged to contain an electric heating element; a bowl removably seated on said base to be heated by said element; and a combined binder and support arranged to hold said base and bowl together and furnish means of suspension.

2. Apparatus of the class described comprising a base arranged to contain an electric heating element; a bowl removably seated on said base to be heated by said element; and a removable wire binder provided with a suspending loop at its top and embracing and binding said base and bowl together.

3. Apparatus of the class described comprising a base member having an open socket in its top and one or more openings leading through said base into the bottom of said socket; a bowl arranged to rest upon said base and having a central projection on its bottom fitting into the mouth of said socket; and a combined binder and support arranged to hold said base and bowl together and furnish means of suspension.

4. Apparatus of the class described comprising a base member having an open socket in its top and one or more openings leading through said base into the bottom of said socket; a bowl arranged to rest upon said base and having a central projection on its bottom fitting into the mouth of said socket; and a removable wire binder consisting of a single piece of spring wire folded upon itself to form a suspending loop at the top, the sides of said binder diverging downwardly from said loop to the top of said bowl and being there provided with horizontally extending locking shoulders, there being notches in the top edge of the bowl to engage said shoulders, the sides of said binder extending downwardly from said shoulders, there being registering grooves in the bowl and base to receive said downward extensions, the lower ends of said binder being extended inwardly and upwardly, there being sockets in the bottom of said base to engage said upward extensions.

5. Apparatus of the class described comprising a base arranged to contain an electric heating element, said base being provided with an open shallow socket in its top; a bowl removably seated on said base and having a plurality of positioning recesses in its bottom; positioning pins in said socket engaging said recesses; an electric heating element in said socket; and means for detachably securing said bowl and base together.

6. Apparatus of the class described comprising a base arranged to contain an electric heating element, said base being provided with an open shallow socket in its top; a bowl removably seated on said base and having a plurality of positioning recesses in its bottom; positioning pins in said socket engaging said recesses; an electric heating element in said socket; and a removable wire binder consisting of a single piece of spring wire folded upon itself to form a suspending loop at the top, the sides of said binder diverging downwardly from said loop to the top of said bowl and being there provided with horizontally extending locking shoulders, there being notches in the top edge of the bowl to engage said shoulders, the sides of said binder extending downwardly from said shoulders, there being registering grooves in the bowl and base to receive said downward extensions, the lower ends of said binder being extended inwardly and upwardly, there being sockets in the bottom of said base to engage said upward extensions.

MELVILLE KEIM.